(12) United States Patent
Veshchikov et al.

(10) Patent No.: US 11,847,545 B2
(45) Date of Patent: Dec. 19, 2023

(54) SYSTEMS AND METHODS INVOLVING A COMBINATION OF MACHINE LEARNING MODELS

(71) Applicant: NXP B.V., Eindhoven (NL)

(72) Inventors: Nikita Veshchikov, Brussels (BE); Joppe Willem Bos, Wijgmaal (BE)

(73) Assignee: NXP B.V., Eindhoven (NL)

(*) Notice: Subject to any disclaimer, the term of this patent is extended or adjusted under 35 U.S.C. 154(b) by 1102 days.

(21) Appl. No.: 16/564,490

(22) Filed: Sep. 9, 2019

(65) Prior Publication Data
US 2021/0073684 A1    Mar. 11, 2021

(51) Int. Cl.
*G06N 20/20* (2019.01)
*G06N 20/10* (2019.01)
*G06F 16/903* (2019.01)
*G06N 5/01* (2023.01)

(52) U.S. Cl.
CPC .......... *G06N 20/20* (2019.01); *G06F 16/903* (2019.01); *G06N 20/10* (2019.01); *G06N 5/01* (2023.01)

(58) Field of Classification Search
CPC ........ G06N 20/00; G06N 20/10; G06N 20/20; G06N 5/003; G06N 5/01; G06F 16/903
See application file for complete search history.

(56) References Cited

U.S. PATENT DOCUMENTS

| | | |
|---|---|---|
| 8,595,153 B2 | 11/2013 | Drucker et al. |
| 8,931,101 B2 | 1/2015 | Drucker et al. |
| 10,135,850 B2 | 11/2018 | Brew et al. |
| 2015/0170053 A1 | 6/2015 | Miao |
| 2017/0300814 A1 | 10/2017 | Shaked et al. |
| 2018/0189667 A1* | 7/2018 | Tsou ................ G06N 20/20 |
| 2018/0225369 A1* | 8/2018 | Cora ................ G06N 20/00 |
| 2019/0042878 A1 | 2/2019 | Sheller et al. |
| 2019/0042937 A1* | 2/2019 | Sheller .............. G06N 3/08 |
| 2019/0123982 A1* | 4/2019 | Komarek ........... H04L 41/16 |
| 2019/0130659 A1 | 5/2019 | Ide et al. |

FOREIGN PATENT DOCUMENTS

WO    20180093462 A1    5/2018

OTHER PUBLICATIONS

Lin et al., A Multi-Model Combination Approach for Probabilistic Wind Power Forecasting, Jan. 2019, IEEE Transactions on Sustainable Energy, vol. 10, No. 1, 226-236 (Year: 2019).*

Federated learning is an approach that can be used to update ML models through the analysis of multiple remote models. See https://ai.googleblog.com/2017/04/federated-learning-collaborative.html?m=1.

Tramèr, F. et al. "Stealing machine learning models via prediction apis". In 25th {USENIX} Security Symposium ({USENIX} Security 16), pp. 601-618. (2016).

Džeroski, Saso, and Bernard Ženko. "Is combining classifiers with stacking better than selecting the best one ?. " Machine learning 54.3 (2004): 255-273.).

* cited by examiner

*Primary Examiner* — Shane D Woolwine

(57) ABSTRACT

A combination of machine learning models is provided, according to certain aspects, by a data-aggregation circuit, and a computer server. The data-aggregation circuit is used to assimilate respective sets of output data from at least one of a plurality of circuits to create a new data set, the respective sets of output data being related in that each set of output data is in response to a common data set processed by the machine learning circuitry in the at least one of the plurality of circuits. The computer server uses the new data set to train machine learning operations in at least one of the plurality of circuits.

17 Claims, 4 Drawing Sheets

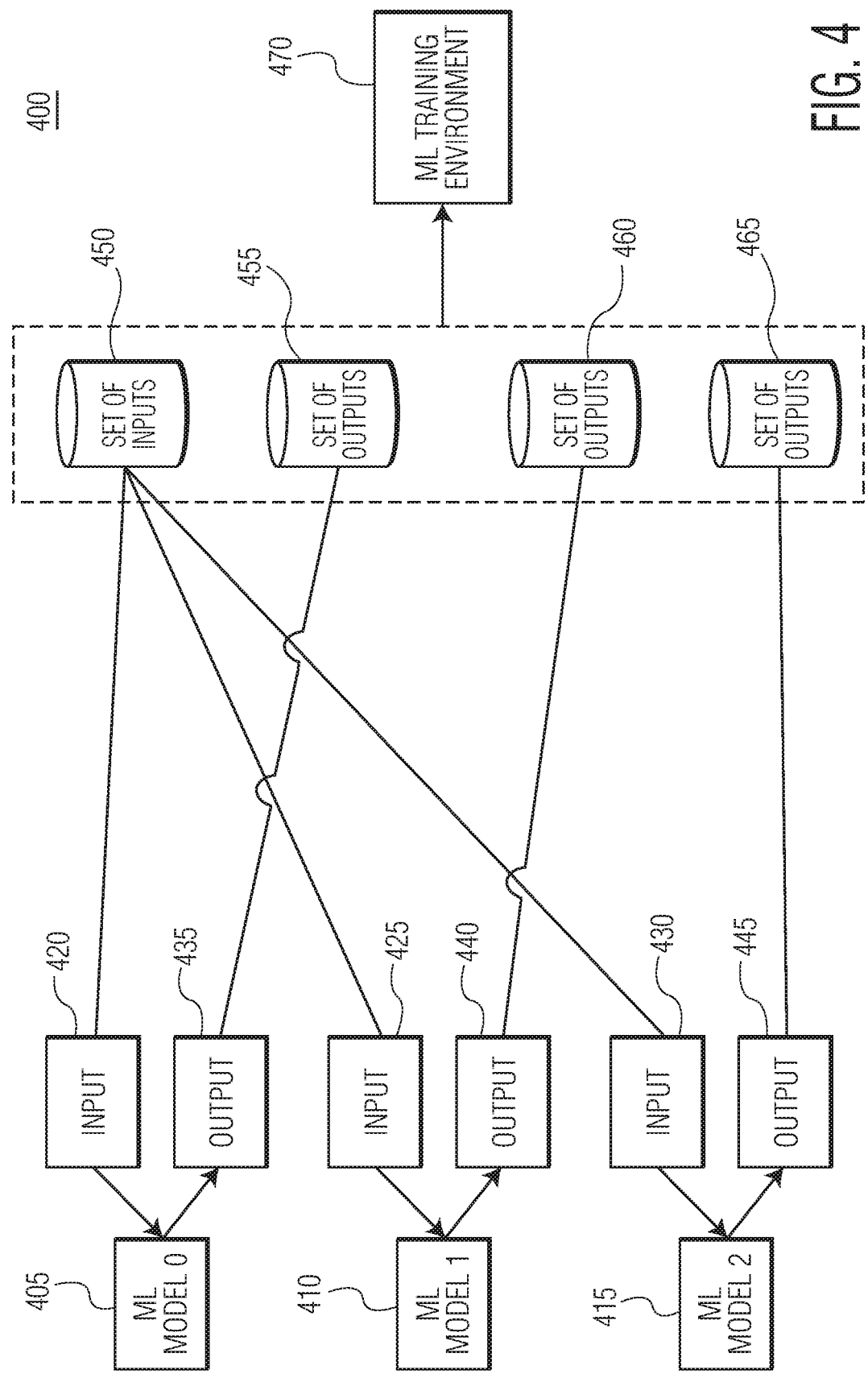

SYSTEMS AND METHODS INVOLVING A COMBINATION OF MACHINE LEARNING MODELS

OVERVIEW

Aspects of various embodiments are directed to systems and methods involving a combination of machine learning models.

Machine learning (ML) is a field of computer science and mathematics. Machine learning allows an extraction of patterns from structured as well as unstructured data sets (e.g., databases). A machine learning model, or simply a model, allows one to extract such patterns. In the domain of machine learning, creation of a model is referred to as training. A machine learning model receives an input and generates an output (e.g., a predicted output, based on a received input). A machine learning model may be used to make predictions about new data that was not used during the training, such as, e.g., predicting the temperature, predicting stock prices, as well as, image classification and voice recognition.

Creating, or training, a good machine learning model may be a difficult task. One of the key components required in such training is a large data set of high-quality objects (e.g., images, audio files, text, etc.) that are handled by a machine learning algorithm during the training process.

Another challenge that may occur in the field of machine learning may be related to robustness of a machine learning model. For instance, in an example, two machine learning models ($M_0$ and $M_1$) may be trained to classify images of cats and dogs using the same training algorithm and the same environment, but having different training data sets (of the same size). If a set of new images of cats and dogs is submitted to both machine learning models, two outcomes are possible: either models $M_0$ and $M_1$ agree (e.g., they both say a particular "image contains a cat") or the models disagree on the output. If both models agree, it generally reflects the quality of the training procedure and the successful extraction of interesting features (i.e., a good model) from the different training data sets. Robustness of a model is dependent upon classification of new images correctly using the model.

These and other matters have presented challenges to creating a good or robust machine learning model, for a variety of applications.

SUMMARY

Various example embodiments are directed to issues such as those addressed above and/or others which may become apparent from the following disclosure concerning a combination of machine learning models.

In certain example embodiments, aspects of the present disclosure involve combining machine learning models for training and/or re-training one or more of the machine learning models.

In a more specific example embodiment, a combination of machine learning models may be provided by a data-aggregation circuit, and a computer server. The data-aggregation circuit may be used to assimilate respective sets of output data from at least one of a plurality of circuits to create a new data set, the respective sets of output data being related in that each set of output data is in response to a common data set processed by the machine-learning circuitry in the at least one of the plurality of circuits. The computer server may use the new data set to train machine-learning operations in at least one of the plurality of circuits.

In another specific example embodiment, a combination of machine learning models may be provided by one or more of a plurality of circuits, a data-aggregation circuit, and a computer server. The one or more of a plurality of circuits may each have machine-learning circuitry embedded therein. The data-aggregation circuit may be used to assimilate, or combine, respective sets of output data from at least one of a plurality of circuits to create a new data set, the respective sets of output data being related in that each set of output data is in response to a common data set processed by the machine-learning circuitry in the at least one of the plurality of circuits. The computer server may use the new data set to train machine-learning operations in at least one of the plurality of circuits.

In another specific example embodiment, a method of combining machine learning models may be provided by: querying at least one of a plurality of circuits, each including machine-learning circuitry, with data sets to prompt respective sets of output data from each of the at least one of the plurality of circuits; assimilating the respective sets of output data to create a new data set; and using the new data set to train machine-learning operations in at least one of the plurality of circuits.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIG. 4 is a block diagram illustrating an example system of combining machine learning models in order to train machine learning circuitry, in accordance with the present disclosure.

Figure 1:
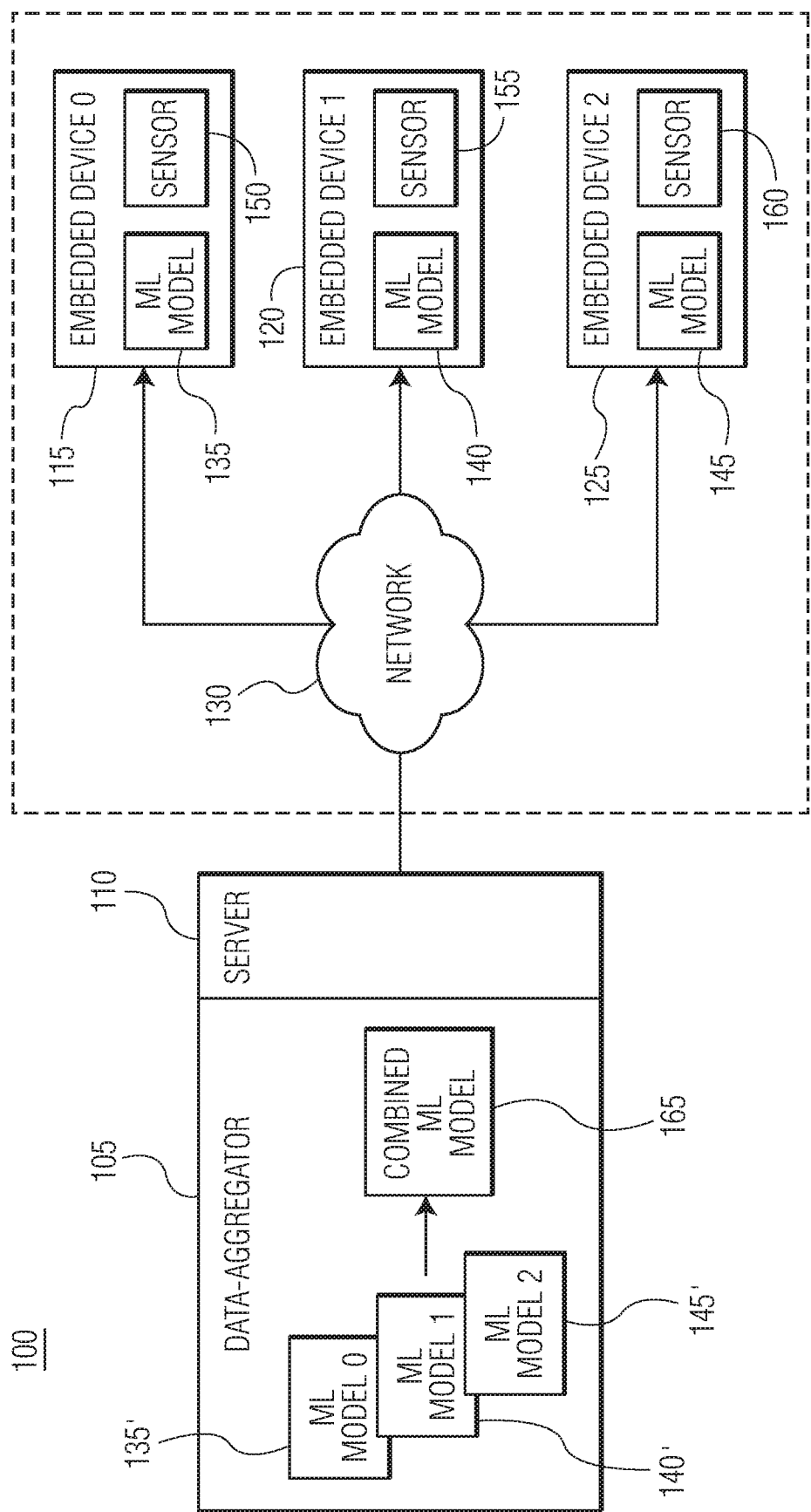
FIG. 1 is a block diagram illustrating an example system of combining machine learning models in order to train machine learning circuitry, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving combining machine learning models for training and/or re-training one or more of the machine learning models. In certain implementations, aspects of the present disclosure have been shown to be beneficial when used in the context of machine learning in connection with consumer devices known as the Internet of Things (IoT), and/or particularly in connection with a computer circuit configured to maintain updated learning and integrity in machine learning circuitry. In some embodiments, machine learning circuitry may include different types of machine learning algorithms, for example, support vector learning, neural network learning, and random forest learning. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Embodiments as characterized herein may be implemented in accordance with a variety of different types of systems and methods in which machine learning models may be desired to be combined. For instance, one or more of the aspects of the disclosure may be implemented in order to combine machine learning models from one or more of a plurality of circuits, or embedded devices, that each include a machine learning model. The combination of the machine learning models may increase robustness of the new, combined machine learning model. Each machine learning model in a single circuit may be created based on a relatively small data set and may not be robust compared to the combined machine learning model.

Machine learning models in the plurality of circuits, or devices (e.g., IoT circuits or devices), in a system, for example, may be based on different machine learning algorithms. A query, or input, may be sent to all or a subset of the plurality of circuits. A data-aggregation circuit may be used to reconstruct a representation of the different machine learning algorithms. This may be achieved, for example, by combining the outputs from the machine learning models, or circuitry, of the plurality of circuits into a combined machine learning model, which may then be sent or served back to the plurality of circuits, or embedded devices, by a computer server. The described combination, sometimes referred to as assimilation, aggregation, and/or merging, allows different machine learning models, based on different algorithms in the plurality of circuits (or devices), to be combined. The original or earlier machine learning models of the plurality of circuits may then be updated, or replaced, based on constructs derived from the combined machine learning model. These constructs may be, for example, hierarchical relationships involving the objects at issue, such as names, contextually-based text, images, music, industrial/vehicular terminology, etc. The updated constructs and/or data sets, as derived from the combined machine learning model may be useful, for example, to give a more stable, or robust, prediction of something (e.g., a temperature, a voting scheme, etc.). Such a stable prediction may be made based on the revised constructs and/or such new data delivered to the plurality of circuits that was not used during the training process of the individual machine learning models.

According to one example, a system-wide machine learning update involving such reconstruction may be aligned with the following steps. At the outset, different models from or corresponding to the respective machine learning-based (e.g., IoT) devices are transferred to the cloud/server. Next, simulated replication is carried out by a computer circuit by first labeling a large amount of working data using some or all of the transferred models. This working data may be random input, non-problem-domain data or problem domain data. Once reconstructed, the computer circuit uses the labeled working data to train one new model and to resolve any ambiguities between outputs. The new model now has the merged behavior of all transferred models, and the new model is pushed as an update to all (IoT) devices, thereby training the different models based on the reconstruction.

The above and other examples in accordance with the present disclosure are directed to systems and methods of combining machine learning models. The system may, for example, include a data-aggregation circuit and a computer server. The data-aggregation circuit may be configured and arranged to assimilate, or combine, respective sets of output data from at least one of a plurality of circuits to create a new data set, the respective sets of output data being related in that each set of output data is in response to a common data set, or input, processed by machine learning circuitry in at least one of the plurality of circuits. In some embodiments, these data sets may define the above mentioned constructs, and/or may include more direct revisions to the machine learning program code and/or its object data operated on by the code. The computer server may be configured and arranged to use the new data set to train machine learning operations in at least one of the plurality of circuits. For instance, such training is provided by serving the new data set to machine learning circuitry in one or more of the plurality of circuits, and replacing the earlier machine learning model with the new, combined machine learning model.

In other embodiments, the system, for example, may include one or more of a plurality of circuits, each having machine learning circuitry embedded therein, a data-aggregation circuit, and a computer server. The data-aggregation circuit may be configured and arranged to assimilate respective sets of output data from at least one of a plurality of circuits to create a new data set, the respective sets of output data being related in that each set of output data is in response to a common data set processed by the machine learning circuitry in the at least one of the plurality of circuits. The computer server may be configured and arranged to then use the new data set to train machine learning operations in at least one of the plurality of circuits.

Other embodiments are directed to methods of combining machine learning models in order to train machine learning circuitry, as described above. Querying a plurality of circuits, each including machine-learning circuitry, in accordance with various embodiments, includes sending data sets, or inputs, to prompt respective sets of output data from at least one of the plurality of circuits. The method further includes: assimilating the respective sets of output data to create a new data set; and using the new data set to train machine-learning operations in at least one of the plurality of circuits. The method may be repeated as desired, and may include a feedback loop in order to allow repetition, or additional iterations.

Turning now to the figures, FIG. 1 is a block diagram of an example system 100 of combining machine learning models in order to train machine learning circuitry, in accordance with the present disclosure. As shown, the system 100 includes a data-aggregation circuit 105 and a computer server 110 that communicate. The system 100 also includes a plurality of circuits, or devices. Three such circuits or devices 115, 120, 125, which can communicate through a network 130, and the data-aggregation circuit 105 and computer server 110, are shown, but other numbers of circuits are contemplated. Each of the plurality of circuits 115, 120, 125, or embedded devices, are shown including a machine learning model 135, 140, 145 and a sensor 150, 155, 160, respectively.

In the example embodiment of FIG. 1, the data-aggregation circuit 105 may assimilate (or aggregate, combine or merge) respective sets of output data (indicated as 135', 140', 145') from each of the plurality of circuits 115, 120, 125, or devices, in order to create a new data set, or combined machine learning model 165. The respective sets of output data 135', 140', 145' from each of the plurality of circuits 115, 120, 125 may be related in that each set of output data is in response to a common data set, or input, processed by machine learning circuitry in each of the plurality of circuits 115, 120, 125. The input may, for example, be a query or set of queries. The computer server 110 may then serve the combined machine learning model 165 back to at least one of the plurality of circuits (devices) 115, 120, 125 to train machine learning operations in at least one of the plurality of circuits. The training may be done by using the assimilated, or combined, machine learning model 165 to update the existing machine learning models of one or more of the plurality of circuits 115, 120, 125. The process of training may be repeated as desired. Accordingly, the system 100 may include a feedback loop in order to allow repetition, or additional iterations.

In some embodiments, the data-aggregation circuit may combine the respective sets of output data by using a voting scheme through which at least one of the respective sets of output data may be adversely weighted relative to other ones of the respective sets of output data to be combined, determined to be an outlier. Alternatively, the data-aggregation circuit may combine the respective sets of output data by using a voting scheme through which at least one of the respective sets of output data may be determined to be an outlier.

In examples disclosed herein, the data-aggregation circuit, or data-aggregator device, is implemented by a computer server. However, any other type of computing platform may additionally or alternatively be used such as, for example, a desktop computer, a laptop computer, etc.

In some embodiments, the computer server may use the new data set to provide initial machine learning operations in at least one of the plurality of circuits' machine learning circuitry. Alternatively, the computer server may use the new data set to retrain at least one of the plurality of circuits machine learning circuitry, after the at least one of the plurality of circuits has evolved with machine learning operations based on other input data. Alternatively, the computer server may use the new data set to train machine learning operations in at least multiple ones of the plurality of circuits. Alternatively, in some embodiments, the computer server may use the new data set to retrain the machine learning circuitry in at least one of the plurality of circuits by sending data to cause the machine learning circuitry to be trained by incremental learning.

In example embodiments, the computer server and the data-aggregation circuit may be part of a computer circuit configured to use the machine learning circuitry, after being trained by the computer server, to predict a parameter from among the following: temperature, stock price, image classification, voice recognition classification, individual personal-preference classification (e.g., music or art).

The number of circuits shown in FIG. 1 is three (3), however any number may be contemplated. In some embodiments, a total number of the one or more of a plurality of circuits may be N, wherein the computer server may send a common data set to query M of the plurality of circuits, and wherein the new data set may be derived in response to the common data set being sent to query M of the plurality of circuits. N and M may be positive integers greater than or equal to 2, and M may be greater than N.

In some embodiments, the computer server may cause each of the plurality of circuits to be queried with the common data set and in response, and cause each of the plurality of circuits to generate or derive an associated one of the respective sets of output data. Each of the plurality of circuits may include an Internet of Things (IoT) circuit.

In some embodiments, the machine learning circuitry in one of the plurality of circuits may be different from another of the plurality of circuits. Additionally or alternatively, the respective machine learning circuitries may be programmed with different machine learning algorithms and/or may, for example, be programmed with one of the following different types of machine learning algorithms: support vector learning, neural network learning, and random forest learning.

In examples disclosed herein, the network is a public network such as, for example, the Internet. However, any other network may be used. For example, some or all of the network may be a company's intranet network (e.g. a private network), a user's home network, a public network (e.g., at a coffee shop), etc.

In some embodiments, two or more machine learning models of a plurality of machine learning models, each associated with one circuit, may be combined to result in a new or combined machine learning model. For instance, it is not necessary to query all of the machine learning models in a system with inputs. One may choose to only query a subset of machine learning models (e.g., each time a new circuit is randomly chosen to query) with each input. An advantage of querying a subset of machine learning models may result in a faster result or creation of a combined machine learning model.

The methods and techniques of combining machine learning models described herein can be applied to a variety of systems, situations, and set-ups. The content of the disclosure is not limited to the systems described and shown herein.

Figure 2:
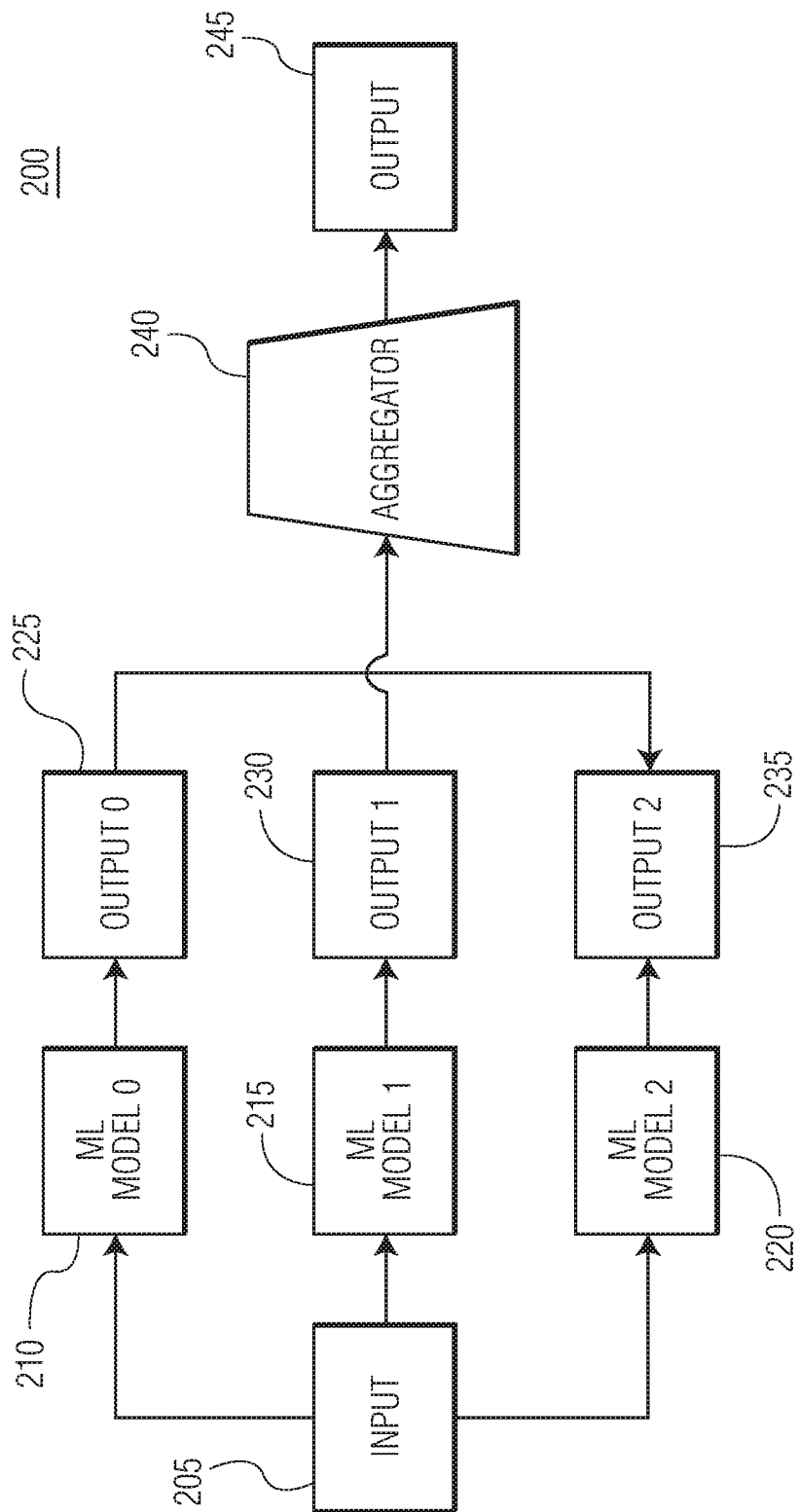
FIG. 2 is a block diagram illustrating an example system of combining machine learning models in order to train machine learning circuitry, in accordance with the present disclosure.

FIG. 2 is a block diagram of an example system 200 of combining machine learning models in order to produce a new data set, or new, combined machine learning model. An input 205, or query, may be sent to one or more of a plurality of machine learning models ($M_0$, $M_1$, $M_2$) 210, 215, 220 that may be embedded in a plurality of devices (e.g., IoT circuits). The outputs ($O_0$, $O_1$, $O_2$) 225, 230, 235, respectively, that result from each machine learning model 210, 215, 220 receiving the input may be sent to a data-aggregator or data-aggregation circuit 240, which may assimilate or combine the outputs 225, 230, 235 and produce a combined machine learning model, shown as output 245. The output, or new data set, 245 may be used to make a stable prediction based on data received by plurality of machine learning models in devices, for example, that was not used in the training process. An advantage of using the new data set, or combined machine learning model, 245 in a plurality of circuits, for example, is that the combined machine learning model is smaller in size that the data package used to result in the combined machine learning model 245. Accordingly, from a perspective of the system 200, the load is less and therefore it is less costly to send the smaller, new data set 245 rather than the large data set used for training (e.g., all data collected from sensors in a plurality of devices).

In some embodiments, the systems described herein and shown may be part of a feedback loop. For instance, the combined machine learning model may be routed back as input into machine learning models in one or more of a plurality of circuits or devices, and may cause another iteration in the system.

Figure 3:
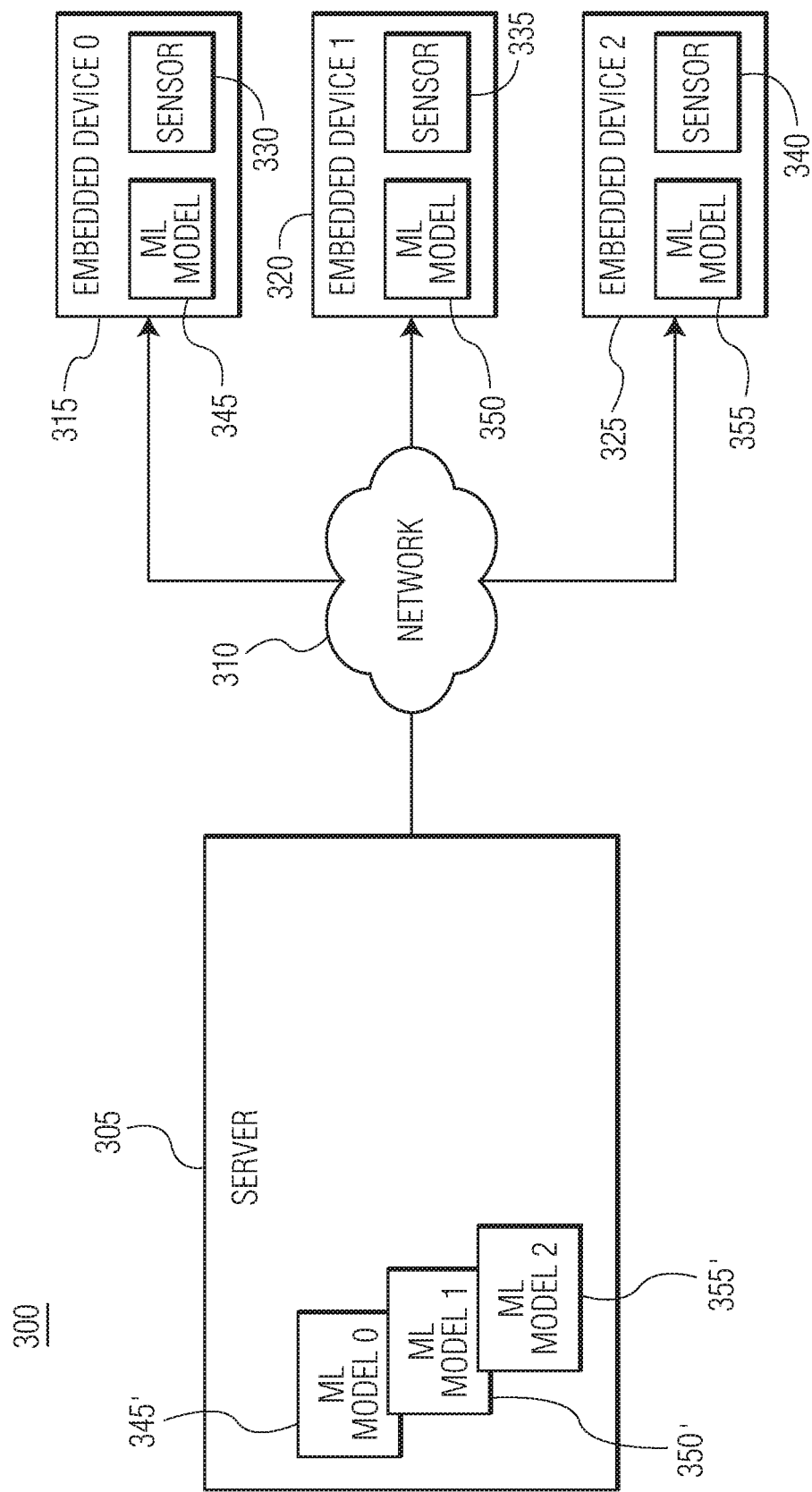
FIG. 3 is a block diagram illustrating an example system of indexing machine learning models from devices, in accordance with the present disclosure.

FIG. 3 is a block diagram of an example system 300 of combining machine learning models in order to produce a new data set, or new, combined machine learning model. System 300 includes a computer server 305, a network 310 and a plurality of devices 315, 320, 325, which each include sensors 330, 335, 340, respectively. In system 300, for instance, the devices 315, 320, 325 may not each have a machine learning model (although they are shown in the figure as 345, 350, 355, respectively). During initialization of the system 300, devices 315, 320, 325 may start collecting data through sensors 330, 335, 340, which include circuitry to sense respective external conditions, for example, industrial/vehicular safety conditions or, in other applications, a type of user profile reference. Once sufficient data is collected, each device 315, 320, 325 may train the machine learning model 345, 350, 355, respectively. Alternatively, the system 300 may include initial machine learning models in each device 315, 320, 325 that may be updated by the system 300.

In the specific embodiment shown, system 300 may allow a significant amount of data to be collected by devices 315, 320, 325 in order to create machine learning models 345, 350, 355. The use of the plurality of devices 315, 320, 325 may allow faster data collection than if one device was used, for example. FIG. 3 illustrates that copies of the machine learning models 345', 350', 355' created by devices 315, 320, 325, respectively, may be sent to the computer server 305, where a new, combined machine learning model (not shown), which is smaller than all data collected by the devices, may be created. The combined machine learning model may be sent through the network 310 to one or more of devices 315, 320, 325 in order to update the machine learning models of each such device.

FIG. 4 is a block diagram of an example system 400 of training and combining machine learning models. A plurality of machine learning models ($M_0$, $M_1$, $M_2$) 405, 410, 415 from a plurality of devices (not shown), for example, may each receive an input 420, 425, 430, respectively, from a set of inputs 450 as may be useful when the respective machine learning models are different from one another. Outputs 435, 440, 445, respectively, may result from the inputs 420, 425, 430 being processed by the machine learning models 405, 410, 415. Sets of outputs 455, 460, 465, rather than individual outputs, may result from the system 400 being used multiple times. Using the system 400 multiple times to modify and update the machine learning models 405, 410, 415 may be termed incremental learning. The set of inputs 450 and sets of outputs 455, 460, 465 may be used to produce a machine learning training environment 470. System 400 may be used to combine different machine learning models using different machine learning algorithms (e.g., support vector machine, neural network, random forest, etc.).

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules, device, system, and/or other circuit-type depictions. Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the systems shown in FIGS. 1-4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims

What is claimed is:

1. An apparatus comprising:
   a plurality of embedded devices, each embedded device comprising a machine learning model and a sensor, the sensor coupled to receive input data, the input data used to train the machine learning model to produce a plurality of embedded devices with trained machine learning models; and
   a computer server, coupled to receive the trained machine learning models from the plurality of embedded devices, and to merge the trained machine learning models into a new machine learning model by collecting output data from querying the trained machine learning models with input data, label the output data, and to use the labeled output data to train the new machine learning model, wherein the input data used to train the machine learning models of each of the plurality of embedded devices includes both problem domain data and non-problem domain data.

2. The apparatus of claim 1, wherein the new machine learning model is used to replace or update the machine learning models of the plurality of embedded devices.

3. The apparatus of claim 1, wherein each of the plurality of embedded devices is or includes an Internet of Things (loT) circuit.

4. The apparatus of claim 1, wherein machine learning models of each of the plurality of embedded devices are different from another each other.

5. The apparatus of claim 1, wherein in each of the plurality of embedded devices, the machine learning model may be one of a support vector machine, a neural network, or a random forest.

6. The apparatus of claim 1, wherein the-computer server is connected to the plurality of embedded devices via a network.

7. The apparatus of claim 1, wherein the new machine learning model, after being trained by the computer server, is used to predict a parameter from among the following: temperature, stock price, image classification, voice recognition classification, and individual personal-preference classification.

8. An apparatus comprising:
   a plurality of circuits, each circuit of the plurality of circuits having machine learning circuitry embedded therein;
   a computer server, coupled to receive the machine learning circuitry from each of the plurality of circuits, and to create a new machine learning model by collecting output data from querying the machine learning circuitries with input data, label the output data, and to use the output data to train the new machine learning model, wherein the input data used to train the machine learning circuitry of each of the plurality of circuits includes both problem domain data and non-problem domain data, and wherein the new machine learning model is used to replace or update the machine learning circuitries of the plurality of circuits.

9. The apparatus of claim 8, wherein each of the plurality of circuits is or includes an Internet of Things (loT) circuit.

10. The apparatus of claim 8, wherein the machine learning circuitry in one of the plurality of circuits is different from machine learning circuitry in another of the plurality of circuits.

11. The apparatus of claim 8, wherein in each of at least one of the plurality of circuits, the respective machine learning circuitries are programmed with different machine learning algorithms.

12. The apparatus of claim 8, wherein in each of at least one of the plurality of circuits, the respective machine learning circuitries are programmed with at least two of the following different types of machine learning algorithms: support vector learning, neural network learning, and random forest learning.

13. A method comprising:
   querying a plurality of circuits, each including machine learning circuitry, with input data sets to prompt respective sets of output data from the at least one of the plurality of circuits, wherein the input data sets include both problem domain data and non-problem domain data;
   receiving the machine learning circuitry by a computer server from the plurality of circuits;
   combining the respective sets of output data to create a new data set;
   labeling the output data;
   using the new data set to train a new machine learning circuitry; and
   replacing the machine learning circuitry of the plurality of circuits with the new machine learning circuitry.

14. The method of claim 13, wherein the step of querying applies to each of the plurality of circuits.

15. The method of claim 13, wherein the plurality of circuits are devices including sensors, the sensors to provide the data sets to prompt the respective sets of output data.

16. The method of claim 13, further comprising repeating the steps of the method in a feedback loop.

17. The method of claim 13, wherein each of the plurality of circuits is or includes an Internet of Things (loT) circuit.

* * * * *